(12) United States Patent
Tsujiguchi

(10) Patent No.: US 7,135,216 B2
(45) Date of Patent: Nov. 14, 2006

(54) WEATHER STRIP FOR CAR AND PRODUCTION METHOD THEREOF

(75) Inventor: Shoichi Tsujiguchi, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 10/643,469

(22) Filed: Aug. 19, 2003

(65) Prior Publication Data
US 2004/0043188 A1 Mar. 4, 2004

(30) Foreign Application Priority Data
Sep. 3, 2002 (JP) .............................. 2002-257546
Dec. 27, 2002 (JP) .............................. 2002-379181

(51) Int. Cl.
*B32G 3/26* (2006.01)
(52) U.S. Cl. ...................................... 428/122; 49/490.1

(58) Field of Classification Search ................ 428/122, 428/138, 140; 49/490.1
See application file for complete search history.

(56) References Cited

U.S. PATENT DOCUMENTS 5,686,165 A * 11/1997 Cook .......................... 428/122
6,761,954 B1 * 7/2004 Hauser ........................ 428/108

* cited by examiner

*Primary Examiner*—Alexander S. Thomas
(74) *Attorney, Agent, or Firm*—Flynn, Thiel, Boutell & Tanis, P.C.

(57) ABSTRACT

There is provided a weather strip for a car which is made up of a grip and a seal part. The grip is U-shaped in cross section and is attached to a flange. The grip has a holder part and an insert which is embedded in the holder part. The seal part performs a sealing function. The holder part is made of an olefinic rubber or thermoplastic resin, and the insert is made of an olefinic thermoplastic elastomer or a material containing a filler such as talc or glass fiber.

8 Claims, 4 Drawing Sheets

WEATHER STRIP FOR CAR AND PRODUCTION METHOD THEREOF

FIELD OF THE INVENTION

This invention relates to a weather strip for a car which comprises an insert made of thermoplastic elastomer embedded in a grip. This invention also relates to a production method of such weather strip.

BACKGROUND OF THE INVENTION

Conventionally, there is provided a metal insert in a grip of a weather strip which, for example, is attached to a flange formed along an opening for a door in a car body. This insert performs an important function for firmly attaching a grip to the flange.

However, since the conventional insert is made of metal, it is heavy and difficult to handle and, as such, has become a drawback in reducing the weight of a car. Further, since the conventional insert is made of metal, it corrodes and produces rust, decreasing the mechanical strength and outlook of the weather strip. Moreover, in order to recycle materials forming the weather strip, it is necessary to remove the embedded metal insert from the grip, so that there is required a lot of manpower in doing so, and such has become another drawback.

This invention is invented to overcome those drawbacks, and it is an object of the invention to provide a weather strip which is reduced in weight, is prevented from producing corrosion and rust, and is easy to recycle materials forming the weather strip. It is another object of this invention to provide a production method which can easily produce such a weather strip.

It is still another object of the invention to overcome a newly developed drawback which is raised as the present invention comprises an insert made of a thermoplastic elastomer instead of the conventional metal insert. That is, according to the conventional weather strip comprising the metal insert, a coating material (rubber or thermoplastic elastomer) covering the metal insert does not fuse with the metal insert, so that it is easy to bend the weather strip along curved lines of corners.

However, when an insert made of thermoplastic elastomer is used instead of the metal insert, and when the insert as well as the coating materials are both made of olefinic materials, the insert and the coating material fuse with each other by heat when they are co-extruded. Therefore, it is difficult to bend the weather strip along the corners as an extension of the coating material is restrained by the insert. Because of this reason, a bending operation of the weather strip cannot be performed smoothly. One of the objects of this invention is to solve such a problem.

SUMMARY OF THE INVENTION

The present invention will be described referring to FIGS. 1 to 5. A weather strip for a car according to a first aspect of the invention comprises a grip 2 and a seal part 5. The grip 2 is U-shaped in cross section and is attached to a flange. The grip 2 comprises a holder part 3 and an insert 4 which is embedded in the holder part 3. The seal part 5 performs a sealing function. The holder part 3 is made of an olefinic rubber or thermoplastic resin, and the insert 4 is made of an olefinic thermoplastic elastomer or material comprising a filler such as talc or glass fiber.

A weather strip for a car according to a second aspect of the invention is characterized that in the first aspect of the invention, the thermoplastic elastomer forming the insert 4 is polypropylene.

A weather strip for a car according to a third aspect of the invention is characterized that in the first or second aspect of the invention, the thermoplastic elastomer forming the insert 4 has a Young's modulus in flexure of 2,000 to 5,000 MPa.

A weather strip for a car according to a fourth aspect of the invention is characterized that in the first, second or third aspect of the invention, the rubber or thermoplastic elastomer forming the holder part 3 has a tensile strength of 2.5 MPa or less, preferably 2.0 MPa or less, at 100% extension.

A production method of a weather strip for a car according to a fifth aspect of the invention comprises at least the under-mentioned processes. The weather strip includes a grip 2 and a seal part 5. The grip 2 is U-shaped in cross-section and is attached to a flange. The grip 2 comprises a holder part 3 and an insert 4 which is embedded in the holder part 3. The seal part 5 performs a sealing function. The production method comprises an insert forming process, a grip forming process and a final forming process. In the insert forming process, the insert 4 made of thermoplastic elastomer is extruded by a thermoplastic elastomer extruding machine 10 into an expanded flat configuration or roughly mountain configuration in cross section. In the grip forming process, a grip 2 is formed by co-extruding the insert 4 with the holder part 3. In the final forming process, the grip 2 is formed into a U-shaped configuration in cross section by a sizing roll machine 14 while it is cooled down near the melting temperature of the thermoplastic elastomer.

A production method of a weather strip for a car according to a sixth aspect of the invention comprises at least the under-mentioned processes. The weather strip comprises a grip. 2 and a seal part 5. The grip 2 is U-shaped in cross section and is attached to a flange. The grip 2 comprises a holder part 3 and an insert 4 which is embedded in the holder part 3. The seal part 5 performs a sealing function. The production method comprises an insert forming process, a pattern forming process, a grip forming process and a final forming process. In the insert forming process, the insert 4 made of thermoplastic elastomer is extruded by a thermoplastic elastomer extruding machine 10 in an expanded flat configuration or roughly mountain configuration in cross section. In the pattern forming process, the insert 4 is formed into a certain pattern by a roll machine 11. In the grip forming process, a grip 2 is formed by co-extruding the insert 4 with the holder part 3. In the final forming process, the grip 2 is formed into a U-shaped configuration in cross-section by a sizing roll machine 14 while it is cooled down near the melting temperature of the thermoplastic elastomer.

BRIEF DESCRIPTION OF THE INVENTION

PREFERRED EMBODIMENT OF THE INVENTION

Figure 1:
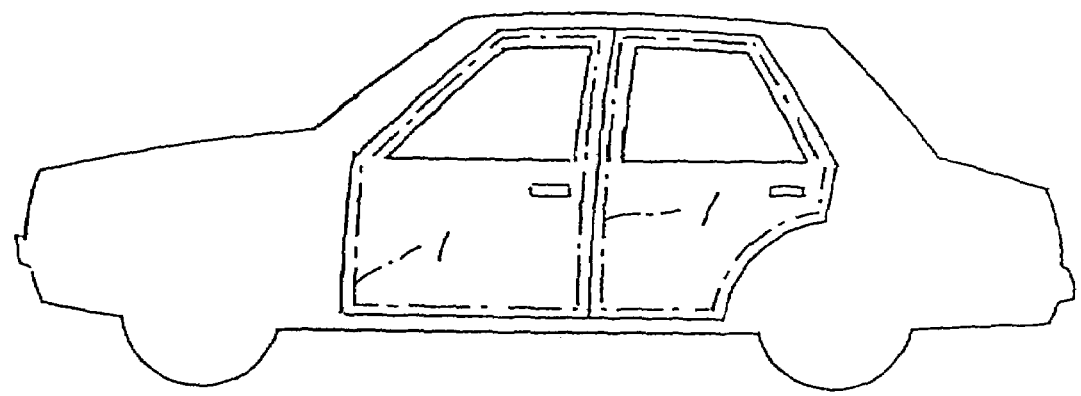
FIG. 1 is a side view showing a car comprising a weather strip for a car according to the invention.
Figure 2:
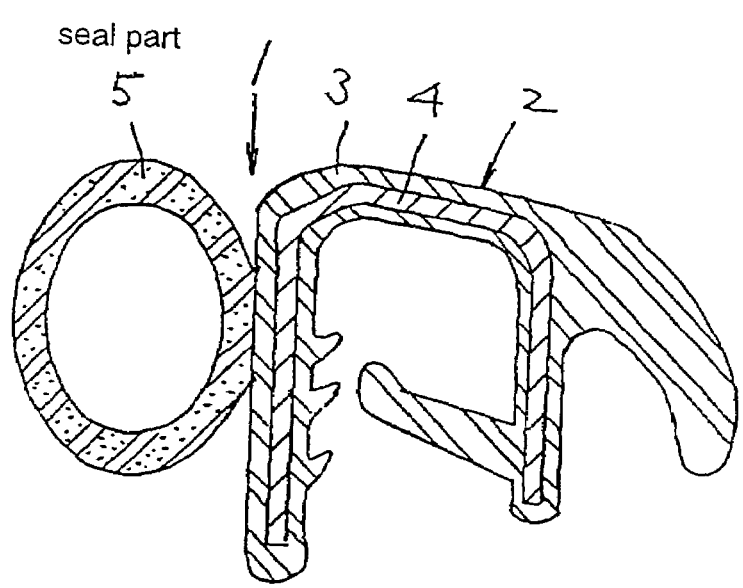
FIG. 2 is a cross section view showing an embodiment of a weather strip for a car according to the invention.

A weather strip 1 for a car according to an embodiment of the present invention is illustrated in FIGS. 1 and 2. This weather strip is attached to a flange formed along an opening for a door made in a car body, and it comprises a grip 2 and a seal part 5. The grip 2 is U-shaped in cross-section and comprises a holder part 3 and an insert 4 which is embedded in the holder part 3. The seal part 5 is hollow-shaped and is integrally molded with the grip 2, and it makes a resilient contact with a door panel, performing a sealing function.

The holder part 3 is made of olefinic ethylene-propylene-diene-methylene-linkage sold rubber, EPDM, and the seal part 5 is made of EPDM sponge rubber. Further, the insert 4 is made of polypropylene which is olefinic thermoplastic elastomer. The olefinic thermoplastic elastomer is similar to EPDM which is olefinic rubber. It can contain a filler (additive), such as talc or glass fiber in polypropylene, in order to increase its mechanical strength. The holder part 3 may be formed of an olefinic thermoplastic elastomer, TPE.

The polypropylene forming the insert 4 has a Young's modulus in flexure of 2,000 to 5,000 MPa, and the grip 2 comprising the insert 4 is provided with enough mechanical strength to firmly hold a flange.

According to this weather strip 1 for a car, the insert 4 is made of a synthetic thermoplastic elastomer instead of a metal unlike the conventional art, so that the weight of this weather strip 1 can be reduced to 70% or less compared to the conventional weather strip, thereby achieving a weight reduction of the weather strip 1 to a great extent. Further, since the insert 4 is made of an elastomer, it can prevent a generation of corrosion and rust. Moreover, the insert 4 is made of a polypropylene resin which is olefinic and is similar to olefinic EPDM forming the holder part 3 and the seal part 5, so that it is unneeded to remove the insert 4 when recycling the weather strip 1. Therefore, it becomes easier to recycle the weather strip 1.

Figure 3:
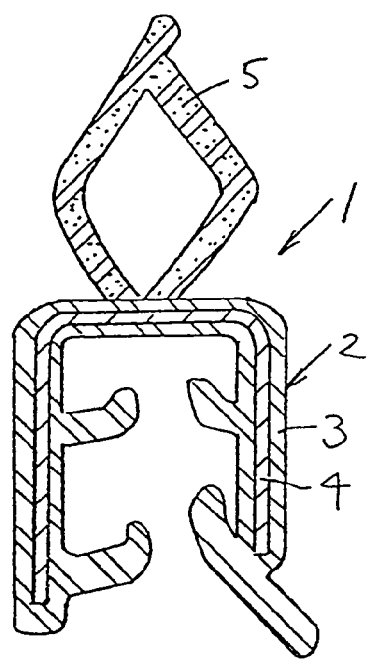
FIG. 3 is a cross section view showing another embodiment of a weather strip for a car according to the invention.
Figure 4:
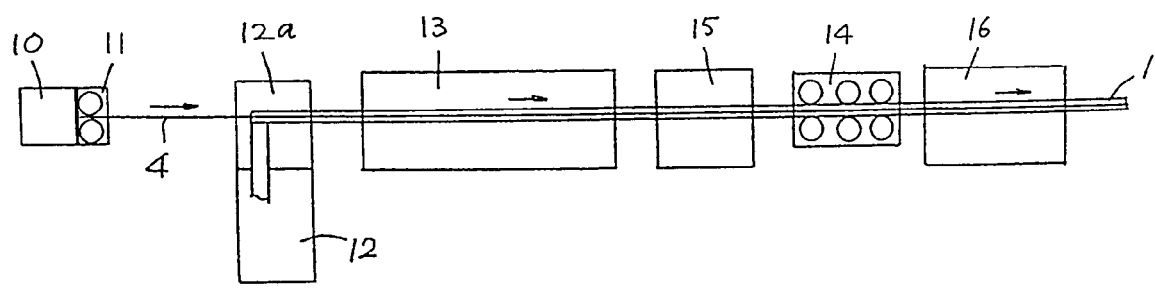
FIG. 4 is a process chart showing a production method according to the invention.

A composition of a weather strip 1 for a car according to this invention can be applied to all types of weather strips comprising inserts, and it is not limited to the one which is attached to an opening for a door formed in a car body. Therefore, it can be applied, for example, to a weather strip 1 illustrated in FIG. 3 which is attached to a place besides the opening for a door.

Further, the weather strip 1 according to this embodiment is such that the EPDM solid rubber or thermoplastic elastomer forming the holder part 3 has a tensile strength of 2.0 MPa or less at 100% extension, that is, the tensile strength of EPDM solid rubber or thermoplastic elastomer is 2.0 MPa or less at the time said EPDM solid rubber or thermoplastic elastomer is extended twice. Therefore there can be maintained a followability of the weather strip 1 at corner sections of a car body.

As described above, by co-extruding the insert 4 and the holder part (cover material) 3 with similar materials, they are fused with each other by heat, and thus an extension of the holder part 3 is restrained by the insert 4 when the weather strip 1 is bent in order to attach it to the corner sections of a car body.

Figure 6:
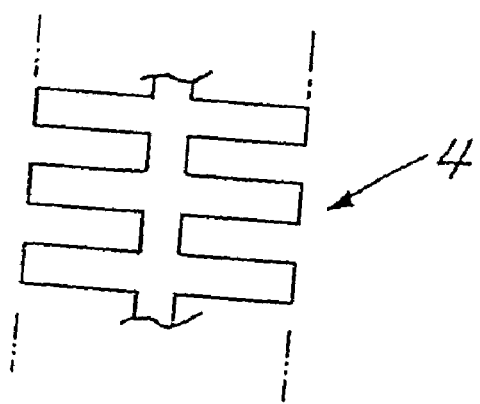
FIG. 6 is a developed plan view showing an embodiment of a fish-bone type insert formed in the embodiment illustrated in FIG. 4.
Figure 7:
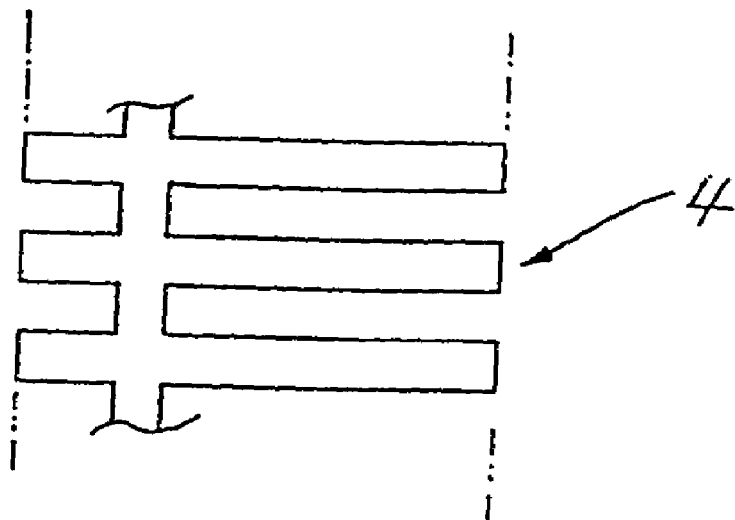
FIG. 7 is a developed plan view showing another example of an insert formed in the embodiment illustrated in FIG. 4.

In order to solve such drawback, the inventors and their associates conducted an experimental test in which an extension of a holder part 3 according to this invention is compared with that of a cover material according to the prior art. The holder part 3 is made of olefinic rubber comprising an embedded insert which is made of olefinic thermoplastic elastomer which is similar to the olefinic rubber, while the cover material of the prior art comprises an embedded metal insert. In this test, there were used fish-bone type inserts as illustrated in FIG. 6 and a one-side-connect type inserts as illustrated in FIG. 7. According to the test, in both fish-bone and one-side-connect types, the extension ratio of the inserts 4 according to the present invention were ½ or less of that of the conventional cover materials, whereas the bending stress of the former two types according to the present invention were approximately more than two times larger than that of the conventional materials.

According to this test result, the inventors and their associates came to a conclusion that the holder part 3 according to this invention should be one having an extension ratio of about twice as high as that of the conventional cover material (that is, the tensile strength of the holder part 3 should be approximately less than ½ of that of the conventional cover material) in order to maintain the followability of the holder part 3 against corner sections of a car body similar to the conventional cover material.

Based on this conclusion, the inventors and their associates measured the tensile strength of the conventional cover material, and found out that it was 4 to 5 MPa at 100% extension. Accordingly, it was decided that the tensile strength of the material forming the holder part 3 according to the present invention should be 2.5 MPa or less, preferably 2.0 MPa or less, which is less than one half of 4 to 5 MPa.

By arranging so, when the holder part 3 and the insert 4 are fused with each other by heat as they are formed with similar materials and molded by co-extruding, it can maintain the followability of the holder part 3 at the corner sections of a car as good as the conventional art.

The weather strip 1 for a car described above as an embodiment of the present invention can be produced by a production method according to the invention. The production method according to the invention will be described below.

Figure 5:
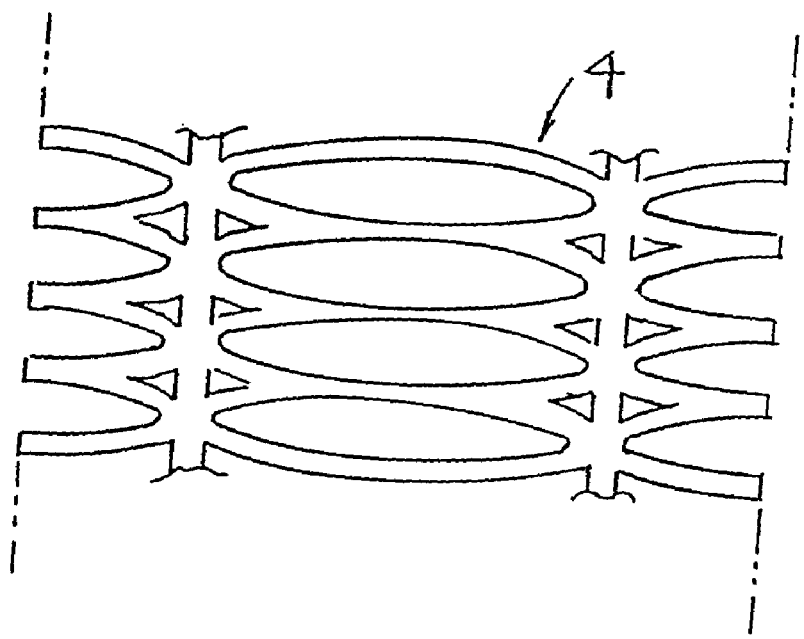
FIG. 5 is a plan view showing an example of a patterned insert (a developed form) formed in a pattern forming process in an embodiment of a production method according to the invention as illustrated in FIG. 4.

First, in an insert forming process, an insert 4 of olefinic thermoplastic elastomer is extruded into an expanded flat configuration or mountain configuration, and not into a U-shape in cross section, by a thermoplastic elastomer extruding machine 10. Then, in a following pattern forming process, the extruded insert 4 is formed into a shape having a certain pattern by a roll machine 11. This pattern is not limited in configuration, and it can, for example, be formed into configurations as illustrated in FIGS. 5 to 7.

In a grip forming process following the pattern forming process, the patterned insert 4 is provided to a rubber extruding machine 12 and it is co-extruded with a holder part 3 made of rubber (EPDM) from the head 12a of the machine, thereby forming a grip 2. Further, in a vulcanizing process, the grip 2 is carried through a vulcanizing furnace 13 which is heated around 250° C., thereby forming a holder part 3. In this process, the embedded insert 4 is covered with the vulcanized holder part 3 therearound, so that the insert 4 is in a molten condition though it still maintains the configurations thereof.

Then, a semi-manufactured product carried out of the vulcanizing furnace 13 is cooled down around 180° C. (which is near the melting temperature of thermoplastic elastomer) in a primary cooling machine 15, and in a following final forming process, the grip 2 is formed into a U-shape configuration in cross-section by a sizing roll machine 14. Finally, after forming into the U-shape configuration, it is cooled down below the melting temperature of the thermoplastic elastomer by such as a secondary cooling machine 16, thereby forming a weather strip 1.

According to the production method of a weather strip for a car described above, the entire process starting from the formation of the insert 4 and the patterning thereof through the final forming process is automatically and continuously carried, so that there can be easily produced a weather strip 1 comprising an insert 4 made of a thermoplastic elastomer. Especially, in the insert forming process, the insert 4 is extruded into the expanded flat configuration or roughly mountain configuration and not in a U-shape in cross-section, and in the following vulcanizing process, the insert 4 is melted by the heat of the vulcanization of the rubber forming the holder part 3, then in the following final forming process the softened insert 4 is formed into a U-shape in cross-section. Therefore, there can be easily produced an entire portion of the weather strip 1 including especially the insert 4 made of the thermoplastic elastomer.

Figure 8:
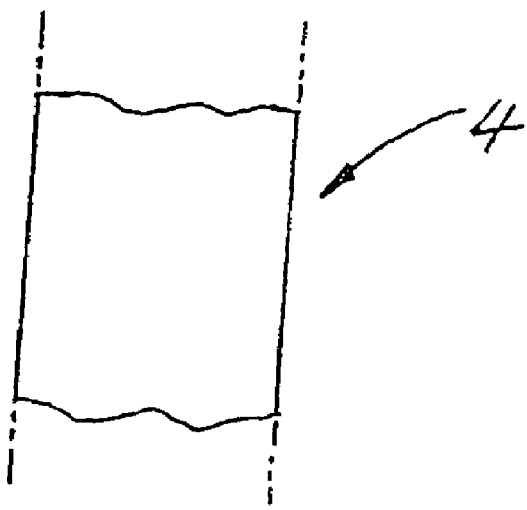
FIG. 8 is a developed plan view showing an insert as a reference.

There may be employed an insert made of a thermoplastic elastomer having a configuration of a flat-plate type as illustrated in FIG. 8 (which has no punching holes) for a weather strip, if it is to be attached merely to a straight-line section of a car body. However, there may preferably be employed an insert made of a thermoplastic elastomer having a configuration as illustrated in FIGS. 6 and 7 for a weather strip to be attached to a corner section of a car body. Such a configuration is also employed in a conventional metal insert. (FIG. 6 indicates a fish-bone type and FIG. 7 indicates a one-side-connect type). Further, as illustrated in FIG. 5, the insert 4 may be formed in a configuration as illustrated in FIG. 5 where punching holes are formed at both the edge sides and central part while connecting parts are formed at both sides. Moreover, the patterns of the insert are not limited to those types.

According to a weather strip for a car as described in the first aspect of the invention, an insert 4 is made of a thermoplastic elastomer instead of a metal unlike the conventional metal made insert, so that it can achieve a weight reduction of a weather strip including the insert 4 and a car having the weather strip 1 as well. Further, for the same reason, it can prevent generation of corrosion and rust in the insert 4, thereby preventing deterioration of the mechanical strength and outlook of the weather strip 1. Moreover, the insert 4 is made of a polymer material which is similar to the rubber material forming the holder part 3 and seal part 5, so that it is easy to recycle the weather strip 1. Further, by adding a filler such as talc or glass fiber to the material forming the insert 4, the mechanical strength of the insert 4 can be increased.

According to a weather strip 1 for a car as described in the second aspect of the invention, it can, like the first aspect of the invention, make a weight reduction of the weather strip 1 and a car comprising the weather strip 1 while preventing the generation of corrosion and rust, so that recycling of the weather strip 1 becomes easier. Further, the polypropylene forming the insert 4 is a general-purpose thermoplastic elastomer, so that the production cost of the weather strip 1 is inexpensive.

According to a weather strip 1 for a car as described in the third aspect of the invention, the Young's modulus in flexure of thermoplastic elastomer forming an insert 4 is 2,000 to 5,000 MPa, so that like the weather strip as described in the second aspect of the invention, it can increase the mechanical strength of the weather strip 1.

According to a weather strip 1 for a car according to the fourth aspect of the invention, the tensile strength of the rubber or thermoplastic elastomer forming a holder part 3 is 2.5 MPa or less, preferably 2.0 MPa or less, at 100% extension, so that it can easily attach the weather strip 1 to a corner section of a car body with a good followability.

According to a production method of weather strip for a car according to the fifth aspect of the invention, an insert 4 is extruded in an expanded flat configuration or roughly mountain configuration in cross section in an insert forming process, then in a vulcanizing process, the insert 4 is melted while the rubber is vulcanized, and in a following final forming process, the softened insert 4 is formed into a U-shape configuration in cross-section, so that it can easily produce a weather strip including the insert 4.

According to a production method of a weather strip for a car according to the sixth aspect of the invention, it can easily produce a weather strip 1 as well. Further, since this process includes a pattern forming process, it can easily produce a weather strip comprising a patterned insert 4.

The disclosure of Japanese Patent Applications No. 2002-257546 filed Sep. 3, 2002 and No. 2002-379181 filed Dec. 27, 2002 including specification, claims and drawings, is incorporated herein by reference.

What is claimed is:

1. A weather strip for a car, comprising:
    a grip for attachment to a flange, said grip having a U-shaped cross-section and comprising a holder part made of an olefinic rubber or a thermoplastic resin and an insert embedded in the holder part, said insert consisting essentially of an olefinic thermoplastic elastomer and, optionally, a filler; and
    a seal part for performing a sealing function, wherein the thermoplastic elastomer forming the insert has a Young's modulus in flexure of 2,000–5,000 MPa and the rubber or thermoplastic elastomer forming said holder part has a tensile strength no greater than 2.5 MPa at 100% extension.

2. The weather strip for a car as claimed in claim 1, wherein said thermoplastic elastomer forming said insert is polypropylene.

3. The weather strip for a car as claimed in claim 1, wherein said rubber or thermoplastic elastomer forming said holder part has a tensile strength no greater than 2.0 MPa at 100% extension.

4. The weather strip for a car as claimed in claim 1, wherein said insert consists of the olefinic thermoplastic elastomer and, optionally, the filler.

5. The weather strip for a car as claimed in claim 1, wherein the filler is at least one of talc and glass fiber.

6. The weather strip for a car as claimed in claim 1, wherein the seal part is hollow and integrally molded with the grip.

7. The weather strip for a car as claimed in claim 1, wherein the holder part is made of ethylene-propylene-diene-methylene solid rubber.

8. The weather strip for a car as claimed in claim 1, wherein the seal part is made of ethylene-propylene-diene-methylene sponge rubber.

\* \* \* \* \*